(12) United States Patent
Wijbrans et al.

(10) Patent No.: US 9,160,569 B2
(45) Date of Patent: Oct. 13, 2015

(54) MESSAGING SYSTEM AND METHOD

(75) Inventors: Klaas Wijbrans, MV Rijen (NL); Aram Krol, JM Best (NL)

(73) Assignee: MARKPORT LIMITED, Dublin (IE)

( * ) Notice: Subject to any disclaimer, the term of this patent is extended or adjusted under 35 U.S.C. 154(b) by 712 days.

(21) Appl. No.: 13/575,101

(22) PCT Filed: Jan. 31, 2011

(86) PCT No.: PCT/IE2011/000007
§ 371 (c)(1),
(2), (4) Date: Jul. 25, 2012

(87) PCT Pub. No.: WO2011/092680
PCT Pub. Date: Aug. 4, 2011

(65) Prior Publication Data
US 2012/0297004 A1      Nov. 22, 2012

Related U.S. Application Data

(60) Provisional application No. 61/282,390, filed on Feb. 1, 2010.

(51) Int. Cl.
*H04W 4/00* (2009.01)
*H04L 12/58* (2006.01)
*H04W 4/14* (2009.01)

(52) U.S. Cl.
CPC ............ *H04L 12/5895* (2013.01); *H04L 51/28* (2013.01); *H04L 51/38* (2013.01); *H04W 4/14* (2013.01); *H04L 12/5855* (2013.01)

(58) Field of Classification Search
None
See application file for complete search history.

(56) References Cited

U.S. PATENT DOCUMENTS

| | | | | |
|---|---|---|---|---|
| 6,263,212 | B1 * | 7/2001 | Ross et al. | 455/466 |
| 6,308,075 | B1 * | 10/2001 | Irten et al. | 455/466 |
| 7,209,759 | B1 * | 4/2007 | Billing et al. | 455/466 |
| 2002/0159387 | A1 * | 10/2002 | Allison et al. | 370/229 |
| 2003/0114174 | A1 | 6/2003 | Walsh | |
| 2005/0143106 | A1 | 6/2005 | Chan | |
| 2005/0176450 | A1 * | 8/2005 | Bantukul et al. | 455/466 |
| 2008/0171549 | A1 * | 7/2008 | Hursey et al. | 455/445 |
| 2009/0104925 | A1 | 4/2009 | Aula | |

FOREIGN PATENT DOCUMENTS

EP          1962461          8/2008

* cited by examiner

*Primary Examiner* — Bob Phunkulh
(74) *Attorney, Agent, or Firm* — Jacobson Holman, PLLC.

(57) ABSTRACT

A messaging method is implemented by a system in a mobile network in which there are mobile devices including devices A, B, C, D, and E. An originating device sends a message addressed to multiple terminating devices. The system receives the messages and correlates them and routes them to the terminating devices. The system correlates the messages by grouping them according to originating device and sending time frame. The system allocates a global title record address from a pool for the session. The system forwards the messages with an MT-FSM, in which the originating device information is included in the message body, and the recipient address is that of the specific terminating device. The system transmits a confirmation message to the originating device.

24 Claims, 4 Drawing Sheets

MESSAGING SYSTEM AND METHOD

This is a national stage of PCT/IE11/000007 filed Jan. 31, 2011 and published in English, claiming benefit of U.S. provisional application No. 61/282,390, filed Feb. 1, 2010, hereby incorporated by reference.

INTRODUCTION

1. Field of the Invention

The invention relates to peer-to-peer and group messaging in communication networks.

2. Prior Art Discussion

The use of group messaging has seen a rapid increase in usage through instant messaging services. The mobile world is attempting to emulate this success. An example of such an approach is described in US20050143106.

However, there are many fragmented standards, and many proprietary implementations that require smart phones with data access. In addition, the provisioning of such smart services requires over-the-air provisioning of the device, or the subscriber has to set up the appropriate settings on the phone himself.

The group messaging experience is thus only provided to small subsets of the subscribers using fragmented different technologies and proprietary separate clients on the devices. This makes usage of the service poor. In addition, it is not available on the 'legacy' GSM and CDMA networks which are the ones with world-wide coverage and which are especially relevant in developing countries.

In the past, bridges between the various mobile messaging variants have been introduced, and in addition dedicated chat and group messaging servers are known. However, all messages sent to a phone are sent on behalf of a specific large account instead of the original sender of the message. As a result, additional text needs to be added to each individual message containing the actual sender of the message. In addition, managing the inbox becomes more difficult for the recipients as it is no longer possible to view the messages by originator if one wishes to select the messages sent by a specific originator. In addition, a chat server is generally not able to distinguish between multiple simultaneous sessions involving partly the same recipients.

The invention is therefore directed towards providing a system and method for improved peer-to-peer and group messaging, preferably with avoidance of need for the user device to be modified.

SUMMARY OF THE INVENTION

According to the invention, there is provided a messaging method carried out by devices and a messaging system in a communication network, the method comprising the steps of:
- an originating device sending messages with the same content and addressed to multiple terminating devices;
- the system receiving the messages, automatically correlating them as being for group messaging, and routing the messages to the terminating devices with a reply path address including the system; and
- the system storing a group messaging record with data for the originating and terminating devices; and
- the system subsequently receiving a reply from at least one terminating device, routing the reply to the originating device, and forwarding corresponding replies to the other terminating devices in the group.

In one embodiment, the system correlates the messages by grouping them according to originating device and time of sending.

In one embodiment, the system allocates a record address from a pool for the reply path address.

In one embodiment, the record address is a global title (GT) address.

In one embodiment, the system forwards the messages with an MT-FSM, in which the originating device information is included in the message body, and the recipient address is that of the specific terminating device.

In one embodiment, the system transmits a confirmation message to the originating device when routing the messages to the terminating devices.

In another embodiment, the messaging system assigns to each of a plurality of message service centres its own reply path address range for use in group messaging, and the service centre on which a multi-recipient group session originates assigns a reply path address from its own pool to the sessions, and, subsequently, replies are routed back to that specific service centre.

In one embodiment, a session database is local to each service centre.

In one embodiment, a plurality of message service centres of the system are assigned the same reply path address range for use in group messaging sessions, and when a new session originates, the service centre where the session is originating creates the new session in the session database and assigns a common reply path address to the session.

In one embodiment, a session database replicates the change to other session databases, thus ensuring resilience in case of a site failure.

In one embodiment, to indicate that a subscriber is part of the group, an additional message is inserted at an initial submission setting up the group.

In one embodiment, after reception of the initial message from the originating device, an additional message is generated by the system to all recipients indicating that a group session is set up and containing the addresses of all the other recipients, and this message includes the addresses of each recipient in the body text and also uses the same system address in its reply-path field for each recipient as the subsequently forwarded message will use.

In one embodiment, group messaging is automatically set up in response to an initial message from the originating device which includes a command code, and replies to this message do not need to contain the command code, as they use an embedded reply path system address.

In one embodiment, the system operates in response to a control command to extend the group by inviting a party not addressed by the originating device to ongoing group communication by allocating a reply path address for the additional party, informing the other group member by sending a message indicating that the additional party is made part of the group.

In one embodiment, the system operates in response to a control command to remove a party from the group.

In one embodiment, the system operates in response to a control command to send a list of participants who are active in a group session.

In a further embodiment, the system operates in response to a control command to send a reply to only a specified party and not the whole group.

In one embodiment, the system operates in response to a control command to delete a party from the group.

In one embodiment, the system operates in response to a control command to indicate usage of pre-defined group n so that it is not necessary to send a multi-recipient message from the device.

In one embodiment, the system performs automatic group messaging detection by:
- when the message is received from the originating device, storing the message and a time stamp in a database,
- if the originating device sends another message, comparing all relevant fields to the message stored in the database, and if these are the same, the recipient is added to a recipient list in the database for this message and the submission is acknowledged, and
- if any field is different, or after a configurable time-out expires, the group submission is considered to be complete, and the system then starts handling the message as a group message.

In one embodiment, the system performs automatic group messaging detection by the originating device sending all of the messages in a single TCAP session or by the originating device using a field for a flag indicating that additional messages are waiting for submission by the originating device.

In one embodiment, the system performs automatic group messaging detection by recognizing a specific keyword in the message from the originating device as indicating that a new group is to be started.

In one embodiment, the system manages, either remotely or locally, as group messaging database having the following data:
- session data, containing records identifying a group messaging session, the session data having a start time and a modify time, in which the modify time is updated every time a message is exchanged in the group, and in which the session data has a flag indicating whether the session is considered active or expired,
- recipient data linking the recipients in a session to the sessions,
- data per individual subscriber with active or retired session records with the allocated reply path number for that session and a reference to the session, and
- a flag indicating status of the reply path.

In one embodiment, the flag indicating status of the reply path indicates whether it is active, retired or available, and the system manages a time stamp indicating when it went from active to retired, in which if a new session is set up, one of a number of available reply path addresses is selected and allocated to the session, and if a session has been inactive for a set period of time, for each recipient the associated reply path address is set to retired status and the time-stamp is set to that time, and in which after a minimum purge period has passed, the reply path address is set to available so that it can be re-used for new sessions.

In another aspect, the invention provides a messaging system comprising an interface to mobile network elements and a circuit including at least one digital data processor, in which the circuit is adapted to perform the steps of:
- an originating device sending messages with the same content and addressed to multiple terminating devices;
- the system receiving the messages, automatically correlating them as being for group messaging, and routing the messages to the terminating devices with a reply path address including the system; and
- the system storing a group messaging record with data for the originating and terminating devices; and
- the system subsequently receiving a reply from at least one terminating device, routing the reply to the originating device, and forwarding corresponding replies to the other terminating devices in the group The circuit may be further adapted to perform the system method steps of a method of any embodiment described above.

In a further aspect, the invention provides a computer readable medium comprising software code adapted to perform the steps of a method described above in any embodiment when, executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 1:
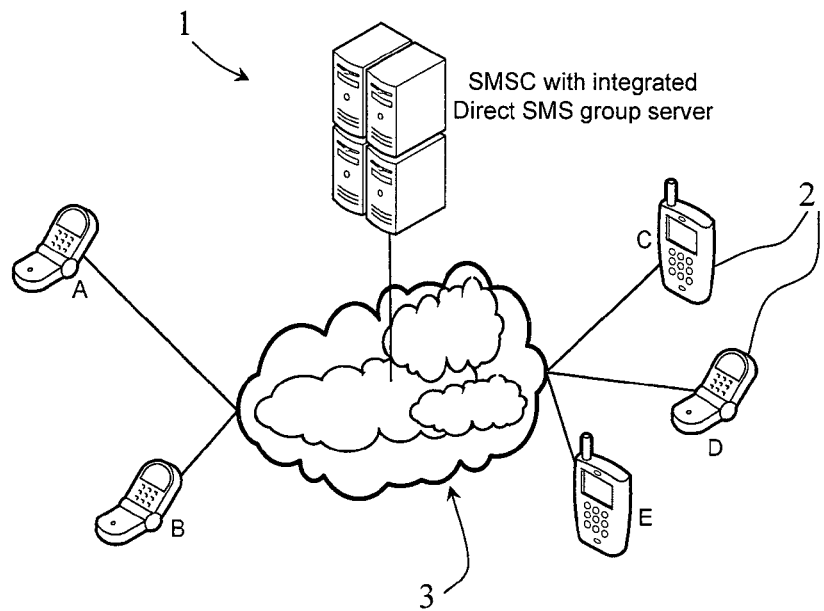
FIG. 1 is a diagram showing at a high level a messaging system of the invention.

Referring to FIG. 1 a messaging system 1 comprises an SMSC with an integrated direct SMS group server. Also, mobile devices 2 are shown in a network 3.

The system 1 has a circuit with digital data processors programmed to re-use the existing legacy device capabilities and protocols while at the same time providing an improved group messaging experience to the users of legacy devices. The group messaging experience can be augmented by smart clients on the devices, but does not require a smart client and is fully interoperable with existing legacy systems and network elements.

In summary, the system 1 received SMS messages addressed to recipients. The system 1 is programmed to automatically recognize that messages with the same content are being sent from a single device to a number of recipients. It then automatically recognizes that this is effectively group messaging, even though the sending device has not sent the messages as such (as it is not capable of doing so). The system 1 then automatically creates a group of the recipients in its database. When relaying the messages to the recipients it uses the reply path field to provide its own reply address. This is one of its allocated global titles ("GTs"). The recipients then, if replying, simple press the reply option on their devices and the replies are automatically send to the system 1. The system 1 recognizes the replies as part of this group messaging session and handles them as such. Thus, group messaging has been achieved in a manner which is completely transparent to the users.

In SMS, the protocol is not multi-recipient capable, so the handset sends the message with the same content multiple times, each time to a different recipient. The detection of the system is to receive all those messages, see that only the recipient is different in each message (and maybe some protocol fields) and based on that automatically create a group for all those recipients.

The system is present in the network with its own SS7 interface and a number of additional global titles (its "GT"

pool). The number of additional global titles required is independent of the size of the operator, but instead determines the number of concurrent group sessions that any subscriber can be part of. The global titles do not have to be allocated as a single consecutive range, but allocating these in a single consecutive range will facilitate routing within the operator network.

The system 1 can be implemented as a separate 'SMS router' like function or as additional functionality in a conventional SMSC. In the description below it is described for a GSM-based network, but the technology is not limited to GSM and will work equally well for IS-41 based networks. For IS-41, a 'Message Center' is equivalent to an SMSC and there are both MO-FSM and MT-FSM PDUs with the SMDPP.

In one scenario, party A wishes to set up a group messaging session with parties B, C, and D. To do this, party A sends a message to both the B party and the C party. The SC address used for this communication is the standard service center address for SMS messaging. However, either the network of the operator is configured to use a direct SMS group messaging server 1 instead of the existing SMSC, or the direct SMS group messaging server 1 is implemented as part of the conventional SMSC. FIG. 1 shows the implementation where the direct SMS group messaging server 1 functionality is integrated with the existing SMSCs of the network. In an alternative embodiment, the direct SMS group server 1 is positioned as an SS7 router in front of the existing SMSCs and forwards all non-group messages to the existing SMSC(s). In both cases, implementation only requires upgrades to existing network elements of a re-configuration of the SS7 routing rules to route all MO-FSM traffic through the direct SMS group messaging server 1, thus preventing a need for device changes.

When the A party wishes to group message with multiple other parties, he initiates a new SMS message, types his text (A-text) and adds the multiple recipients B, C, and D, and presses the send button.

On sending the SMS, the device will send a separate MO-FSM message for each of the recipients B, C, and D to the SIM-configured service center address. The SIM-configured service center address points to the direct SMS group messaging server 1. This can be achieved by replacing the existing SMSC with the direct SMS group messaging server 1 or introducing routing in the network that ensures that all MO-FSM traffic for the SMSC first is routed via the direct SMS group messaging server 1.

Figure 2:
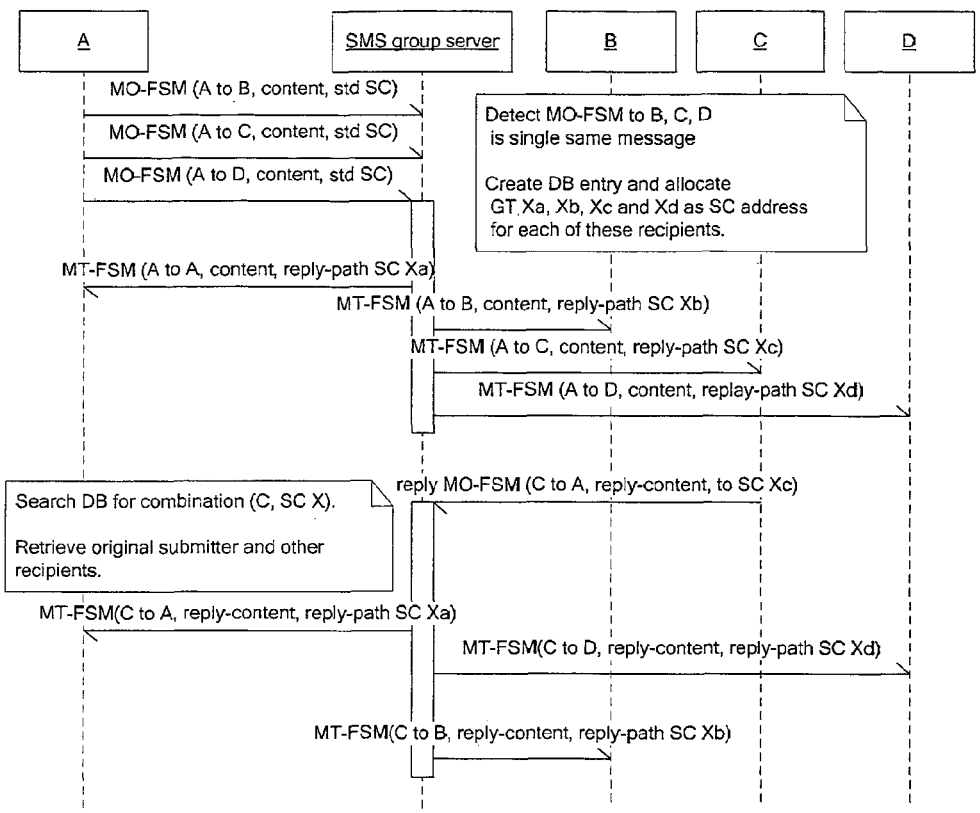
FIG. 2 is a message sequence diagram for a messaging method implemented by the system.

Referring also to FIG. 2, the direct SMS group messaging server accepts the MO-FSM messages and correlates them because the same message content from the same party has been sent from the same device within the configured time frame. The information in the messages is bundled together into the actual SMS content and a list of the sender and recipients (e.g., A-party, B-party, C-party, D-party).

The direct SMS group messaging server 1 accepts the request, allocates a temporary GT from its pool that is currently not used by any session in which any of the current participants participate for each individual participant, and then creates in its database a group messaging record containing the participants and this temporary GT in the database.

Next, the direct SMS group messaging server 1 forwards the message to each of the individual participants. It sends the message using the standard SMS protocol as detailed in 23.040 and 29.002 by sending an MT-FSM to the device after it has received the device location using an SRI or from the cache, but taking into account the following formatting of the SMS at the 23.040 level:

The A-text is used in the body of the SMS.

The A-party address is used as the originating address of the SMS, so that the standard address book that may be resident on the destination phone can link it directly to the sender.

The recipient address is the address of the specific recipient the message is sent to.

The service center address TP-Reply-Path to be replied to is filled with the GT address from the pool which is allocated for this session for that recipient.

The MT-FSM thus will be delivered to the B-party, the C-party, and the D-party devices. In addition, a confirmation SMS is sent to the A-party, which contains the same invitation text and his own A-party address to indicate to him that the conversation has started together with the address from the GT pool allocated for the A-party.

Suppose now the C-party wishes to send a reply to the message from the A-party in the context of this session:

The C-party uses the standard reply functionality on the device

As a result, the recipient address of the SMS will be the A-party, the originating address is the C-party.

The C-party types his text and presses the send button.

The device will construct a MO-FSM message where the originator is the C-party, the recipient is the A-party and send this MO-FSM message directly to the direct SMS group messaging server 1 at GT Xc as it takes the service center GT from the SMS that the C-party is replying to.

The direct SMS group messaging server 1 accepts the message on the GT Xc that it is addressed with.

The direct SMS group messaging server extracts the originator (C) and recipient (A) from the message and GT address Xc from the lower level address the message was received on.

The direct SMS group messaging server 1 searches the record in the session database containing this allocation of C-party, GT Xc and A-party.

The direct SMS group messaging server 1 (if the message is not a control message as described later the group messaging server replicates the messages to all parties registered with this group messaging session by extracting the message content and for each party generating its own MT-FSM consisting of originator (C-party), recipient (the addressed party), message text, and TP-Reply-Path indicate set to the GT Xn used for that party.

Using this procedure, a very intuitive group messaging service is provided using available functionality in the devices, except without the need for device provisioning and learning special formats. No large account addresses are involved, and groups are automatically created based on the actual recipients to which the message is sent. If the recipient device has a group messaging client, it is aware of the TP-Reply-Path address and shows this in the UI, indicating to the end user that the message is part of a group session as the TP-Reply-Path deviates from the standard SC address. For devices that are not group messaging aware it will look like a normal SMS, just the behavior of replying will be different from sending a new message to that recipient. The behaviour of the device is according to the SMS standard; it sends it via TP-ReplyPath. The server addressed uses this fact to then distribute this message to all parties.

The standard address book functionality remains available and for each message the originator is directly known and the user can participate in a group messaging session by just pushing the 'reply' button on the device.

In addition, the efficiency of the usage of the network is optimal as all the fields used are existing protocol fields and no modifications (that lengthen the message) are necessary to indicate the actual sender information.

Integration into the Existing Network

To facilitate integration into an existing network it is necessary to implement the routing rules from the STP to the appropriate SMSC. SMSCs in the network as assigned a GT to allow the device to address the service center. The STPs within the network contain the routing tables to allow them to deliver the MO-FSM PDUs from the devices to the SMSC.

For the invention, the single GT commonly allocated to an SMSC is expanded to a set of GTs where the additional GTs are used to differentiate between sessions. The system allocates a range of GT addresses to the SMSC, as that way the only difference for the STP is that it will use a shorter prefix in its routing table to address the SMSC instead of the full E.164 address.

Geographically Distributed Implementation

At large operators, there may not be a single SMSC but a multitude of SMSCs each covering a specific numbering range or a specific geographical area. In such networks, the following are two options for implementing the SMS group messaging server functionality.

Option 1 (FIG. 3): Each SMSC is assigned its own GT-range for use in sessions. The SMSC on which a multi-recipient group session originates assigns a GT from its own pool to the sessions. All replies, even from other regions will be routed back to that specific SMSC. The session database is local to each SMSC.

Figure 3:
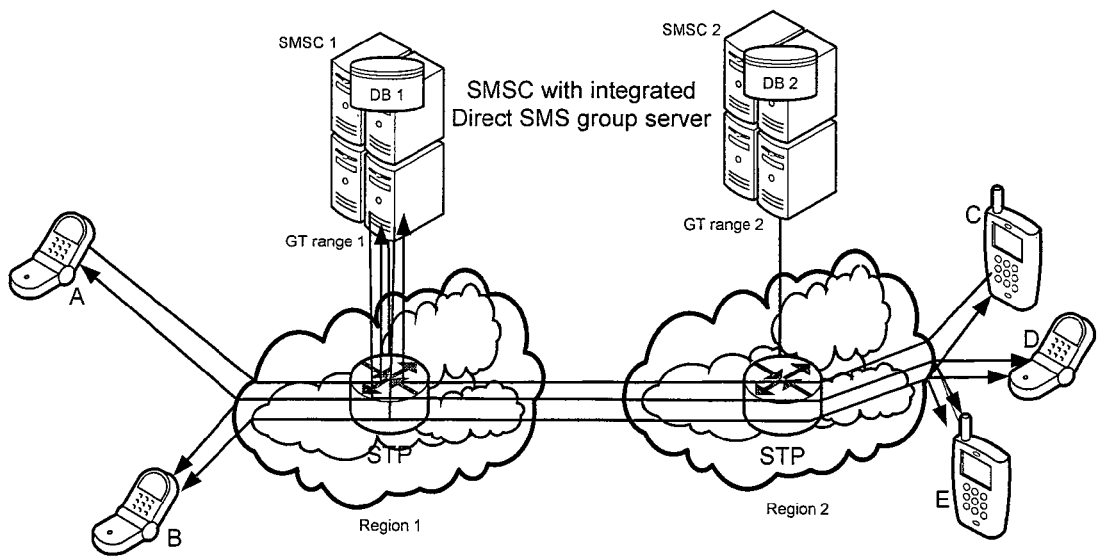
FIGS. 3 and 4 are flow diagrams illustrating operation of systems of different embodiments.

As shown in FIG. 3, SMSC1 creates the session in its session database. When device C replies, the MO-FSM is routed through the STPs directly to the SMSC1 in the region of the original submitter. This SMSC then replicates the SMS to all parties part of the session.

Figure 4:
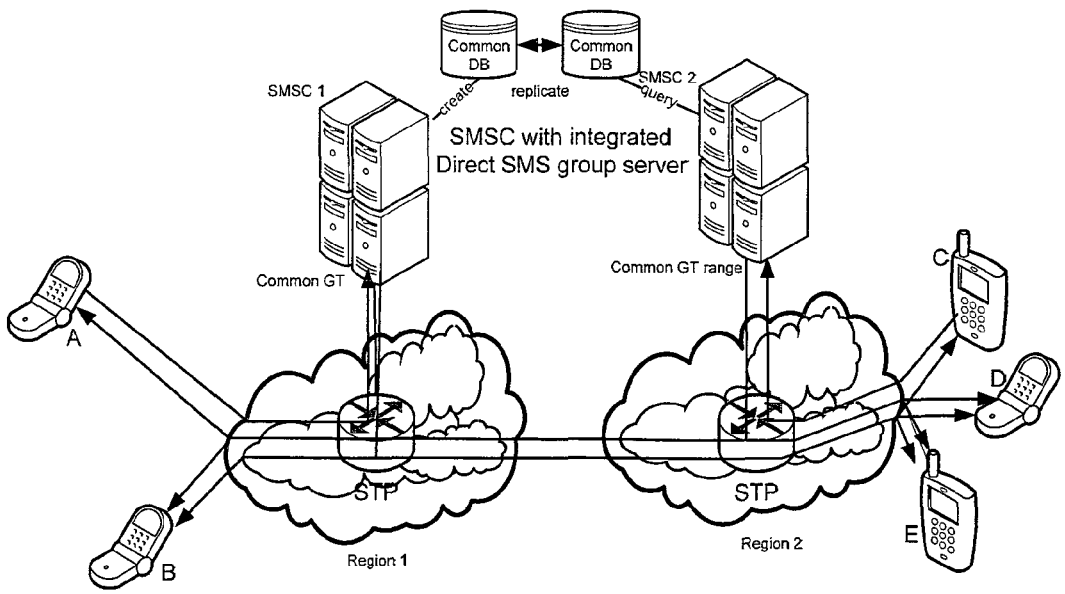

Option 2 (FIG. 4): All SMSCs are assigned the same GT range for use in sessions. The session database is implemented as a separate (redundant) component that can be implemented as part of multiple regions. If a new session originates, the SMSC where the session is originating creates the new session in the session database and assigns a common GT to the session. The session database replicates the change to the other session database copies thus ensuring resilience in case of a site failure.

A reply in any region is always routed back to the regional SMSC, in the example from device C to SMSC2. The regional SMSC2 contacts the replicated (shared) session database and thus determines which session the reply is part of. It then forwards the message to the devices A, B, D and E.

In case the SMSC in a specific region fails, the SS7 network will use a backup route for that global title and route the reply to the SMSC in another region/data center, e.g., if SMSC 1 fails, all replies from device A or B will be routed by the STP in region 1 to via the STP in region 2 to the SMSC 2.

Indicating Group Messages to the End User

To indicate that a subscriber is part of group messages an additional message is inserted in the flow generated at the initial submission setting up the group. In this case, after reception of the initial message by A, an additional message is generated by the SMS group server 1 to all recipients indicating that a group session is set up and containing the addresses of all the other recipients. This message not only contains the addresses of each recipient in the body text, but also uses the same Xn address in its TP-Reply-Path for each recipient as the forwarded message will use.

Another embodiment involves using a 'smart client' on the device. In this case, the reception of a message with a TP-Reply-Path indicates to the device client that the message might be part of a group session. The device client makes this visible for each received message by indicating with an icon (such as one with an image of multiple people) that the message is a multi-recipient or group message. In addition, the client can understand the above initial message and allocate a logical group number to each group, so that the recipient can manage messages to multiple groups and look up the participants on his device. If a range of GTs is allocated to create the groups, a smart client could use the last digits of the GT to indicate the group number in the icon (such as an image of multiple people with an embedded number visible). The smart client could be delivered integrated with new smart phones or as a firmware upgrade to existing devices using the existing firmware upgrade procedures. However, interworking between new devices and existing devices remains seamless.

In such a smart client, in additional functionality can be provided for managing one's participation in the group, such as 'request a list of group members', 'drop out of the group', 'invite another party into the group' et cetera, or also for allowing the creation, modification, deletion and usage of pre-defined groups. By choosing a dedicated format for such messages when coming from a smart client, the Direct SMS group messaging server 1 can automatically detect 'smart clients' when they start sending messages and updates its database for that subscriber to note that the specific subscriber has a 'smart client' device.

A third refinement is to add a small token in the message text for legacy devices not containing a smart client. Though this may increase the message size, in practice such a token could be very small such as a single digit session identifier followed by a not commonly used character, such as 6@ or 6# pre-pended to the message text to indicate that the message is part of group session 6. Due to the small size, it is unlikely in practice that the addition of these two characters will result in the need for generating an additional message segment.

Figure 5:
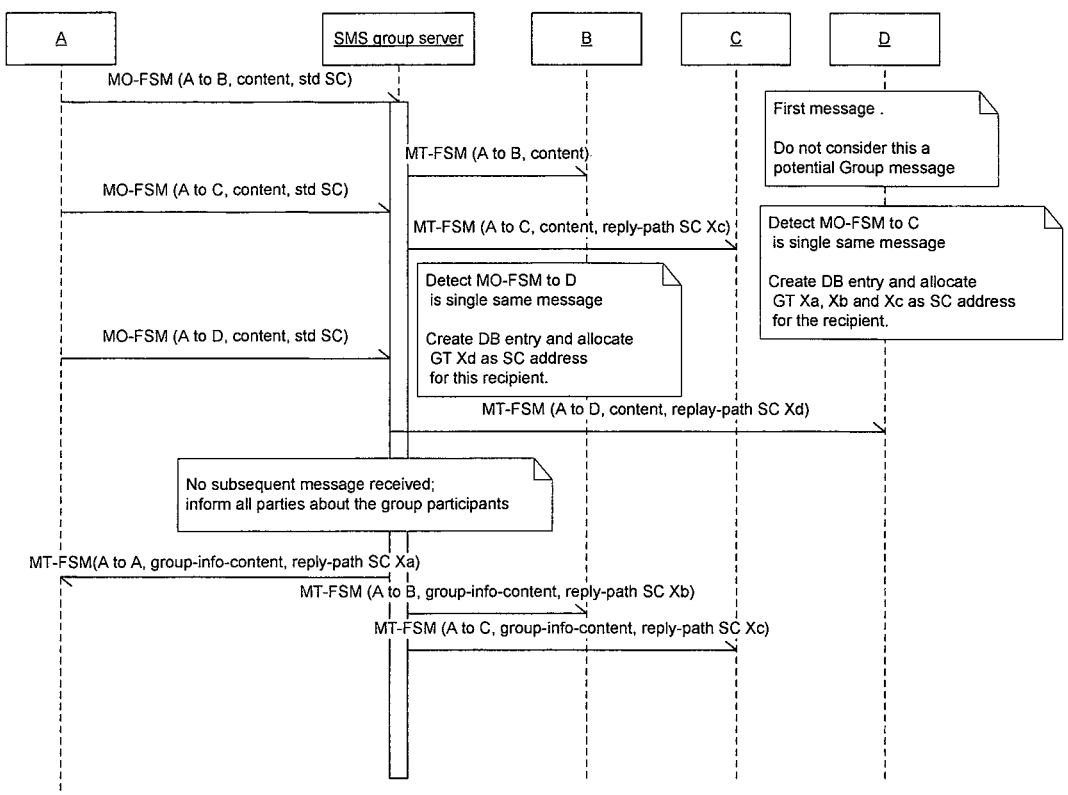
FIGS. 5 and 6 are message sequence diagrams for a further embodiment.

Referring to FIG. 5, in another embodiment the first message is forwarded to the first recipient. When a subsequent message is received, with the same information, then a group is established with three parties. Another subsequent message triggers the addition of the next party to the group. Every time a new member is added or after a certain delay, an additional message is generated by the SMS group server to all recipients indicating that a group session is set up and containing the addresses of all the other recipients. This message not only contains the addresses of each recipient in the body text, but also uses a dedicated Xn address identifying the same session in its TP-Reply-Path for each recipient as the forwarded message will use; except for the first message.

Figure 6:
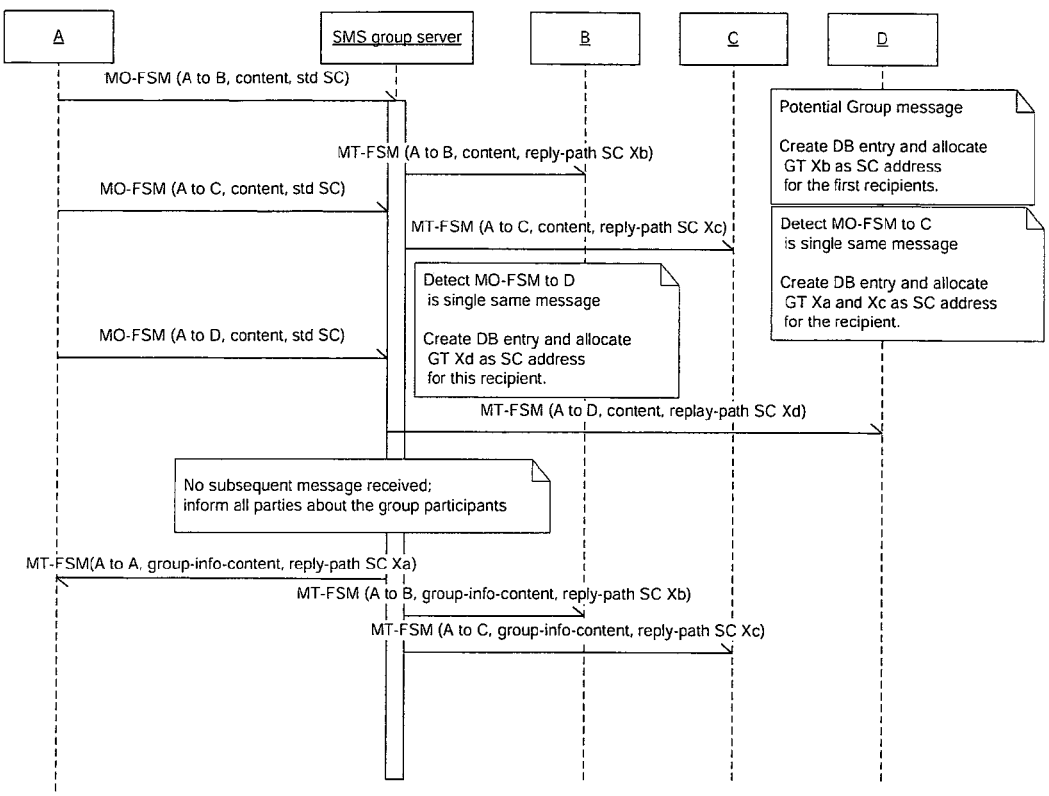

Referring to FIG. 6, in another embodiment the group establishment is done gradually; however every first message is considered a potential group establishment. The first message is forwarded to the first recipient and this message does contain a dedicated Xn address identifying a new session to allow a group establishment when a subsequent (group) message is received. When a subsequent message is received with the same information then a group is established with three parties. Another subsequent message triggers the addition of the next party to the group. Every time a new member is added or after a certain delay, an additional message is generated by the SMS group server to all recipients indicating that a group session is set up and containing the addresses of all the other recipients. This message not only contains the addresses of each recipient in the body text, but also uses the Xn address identifying the same session in its TP-Reply-Path for each recipient as the forwarded message will use.

In practice it is not a problem to see each new message initiation as a new session as the GT range only defines the number of concurrent sessions for an individual subscriber. As it is easily possible to dedicate a GT range of for example 1000 numbers, it is very unlikely that a recipient will run out of sessions within a few days because he is submitting 1000 new messages and never replying.

Both the fourth and the fifth approaches have the additional benefit that no delay on the original message submissions is combined with a significant time window for group creation, making this a very practical approach to retain the fast response benefits of SMS while also allowing group sessions.

Group Set Up Using an Explicit Command in the First Message

In another alternative embodiment, group messages are detected by the first message used for setting up the group containing a specific command code, e.g., 'GRP'. In this case, group messaging is only set up for initial messages starting with this command code. Replies to this message do not need to contain the command code, as they use the embedded SMSC service center address. The main advantage of a dedicated code is that a user cannot accidentally set up a new group when he only intends to send a message to multiple recipients and does not want their replies to go to all of them. Another advantage is that all messages not containing the GRP keyword that are addressed to the default service center address can be handled more efficiently in the normal way as no group lookups are needed on these messages.

Automatic Group Retirement

In theory, a new group could be set up with every submission to multiple recipients. In practice, the number of GTs allocated to the SMS group server is limited. The maximum number of sessions per recipient therefore is limited to the number of GTs allocated per overlapping recipient (e.g., by storing the combination Xc and parties in the group, the same Xc can be used for multiple groups if there are no overlapping recipients in the group).

To avoid accidental sending of messages to a new group that re-used the Xc number, the number of GT used for Xc should be significantly larger than the actual number of Xc used in practice thus making sure that there is a significant amount of time between re-use occurrences.

In practice, this means that a mechanism is needed to de-activate groups and re-use the Xc number. The SMS group server therefore also stores the last usage time per (Xc, party) combination in the group. Whenever the use of a group ages beyond a configurable threshold, the session is de-activated so that the Xc is free for re-use.

As a further refinement, the Direct SMS group messaging server 1 may send a notification that a group is 'retired' to the participants in the group to explicitly inform them of the group retirement. A smart client may be able to interpret this SMS and for example grey out 'icon'.

Control Functionality for Group Management

In addition to the automatic group set up and the automatic group retirement, the SMS group server 1 can be extended functionality for using control commands. These control commands can consist of specific keywords to control the group behavior. The following are examples:

INVITE E; request the SMS group server to invite party E to the ongoing group communication. The SMS group server extends the group with party E by allocating the GT Xe to the party E for this group and its participants. It informs the other group members by sending an SMS indicating that party E is made part of the group and optionally the total list of participants.

DROP OUT; request the SMS group server to remove you from the SMS group server.

INFO; request the SMS group server to send you the list who are active in this group session.

PRIVATE; prefix indicating that this reply should go to the addressed party only and not to the whole group.

CREATE; indicating the creation of a pre-defined group.

ADD; indicating adding a person to a pre-defined group.

DELETE; indicating removal of a person from a pre-defined group.

GRP n; indicating usage of pre-defined group n so that it is not necessary to send a multi-recipient message from the device. If group messaging is only done on this command, the detection process becomes much simpler.

In an alternative embodiment, a simplification of the database is possible in various ways:

Do not store the tuples (Xa, B), (Xa, C) and (Xa, D) in the database but only use the single entry Xa allocated for that subscriber.

Do not allocate a different GT (Xa, Xb, Xc) for individual subscribers but only a single GT across all subscribers in a group.

Only set up group messaging if the first submitter of the multi-recipient message explicitly adds a keyword in front of the message indicating that he wishes to set up a group session, otherwise treat the messages normally.

For group management of pre-defined groups, also a WAP, IVR or Web UI may be provided allowing for the create, add, and delete operations of groups and group members.

A number of details are advantageous for the implementation of the above functionality. These are:

Detection of group sessions based on the MO-FSM submissions.

Database structure with active session table per party and corresponding parties (combination of party address and allocated number of GT pool and reference to the session table) and the session table linking the sessions and recipients together.

Automatic detection of device type.

Application architecture across operators given that parties may reside at different operators including protocol extension for communication across the Direct SMS servers of the various operators.

Detection of Group Sessions

A device will send a single MO-FSM message for each individual recipient. Though a message reference is defined in the standard, the standard is not clear whether these messages should have the same message reference or a different message reference. Therefore, detection of the same message needs to be performed in another way.

This is achieved by:

1. If an MO-FSM submission is received, the SMS group server stores the message in its database and acknowledges it. The time stamp at which the MO-FSM is received is stored as well.

2. If the device sends another message, the SMS group server compares all relevant fields to the message stored in the database. If these are the same, the recipient is added to the recipient list in the database for this message and the submission is acknowledged. Step two is repeated as long as the device sends messages that are the same.

3. If any field is different, or after a configurable time-out expires the group submission is considered to be complete. The SMS group server then starts handling the message as discussed above.
4. As a refinement, for specific devices the device may be able to send all messages as part of a single TCAP session. For those devices, the group messaging server does not need to wait for a time out but the closing of the session by the device will indicate the termination of the group. In addition, a device may use the 'More Messages To Send' field in the 23.040 protocol to indicate that additional messages are waiting for submission by the device.
5. As another alternative, adding a specific keyword in front of the message may indicate to the group messaging server that a new group is to be started. In this case, it may or may not be combined with the previous messages.

To make the detection of the same message more efficient, it may be useful to not only store the original message fields but also calculate a cryptographic signature, e.g., a MD5 hash or SHA-1 hash across all the fixed fields in the message. Detecting that a message is different from what can be done simply by comparing the hashes.

Database Structure

One of the more complex parts in the SMS group server 1 is the database. In principle, the database contains the following tables:
1. Session table, containing records identifying a session that the individual subscriber records refer to. The session table has a start time and a modify time. The modify time is updated every time a message is exchanged in the group. In addition, the table has an attribute that contains the value 'active' as long as the session is considered active and is set to 'inactive' when the session is considered expired.
2 Recipient table, containing records linking the recipients in a session to the sessions themselves.
3. Per individual subscriber with an active or retired session records with the allocated GT number for that session and a reference to the session. In addition, the GT number has a flag associated with it indicating whether it is 'active', 'retired' or 'available', and a time stamp indicating when it went from 'active' to 'retired'. If a new session is set-up, one of the 'available' GT numbers is selected and allocated to the session. If a session has been inactive for a considerable amount of time, for each recipient the associated GT number is set to 'retired' and the time-stamp set to that time. After the minimum 'purge' period has passed, the GT number is set to 'available' so that it can be re-used for new sessions.
4. In the refinement for each individual subscriber an entry indicating whether that recipient has a 'smart client' on his device or a conventional legacy device.

Automatic Detection of Device Type

The 'smart clients' do not need modification of the content of a message. However, in that case the SMS group server needs to know that a subscriber has a smart client.

By defining a specific protocol content for 'Smart clients' to inform the SMS, group server of their existence and to control the sessions, the SMS group server can automatically detect that subscriber has a smart client by:

An automatic reply function with a specific PDU from the smart client stating its capabilities when it receives a legacy session notification (i.e., a text SMS with the allocated Xc address) containing the list of MSISDNs part of the session.

Whenever the end user of the smart client executes a control command the PDU format of the smart client is used, allowing the SMS group server to update its database.

Interconnect Between Operators

One of the weaknesses in a single operator implementation is that it requires the foreign subscribers to reply through the SMS group server of the operator of the subscriber A that initiated this conversation. The issue that the operator of A may have with this is that he will not be able to bill B, C, D or E as he has no billing relation with them if they are in another operator.

Figure 7:
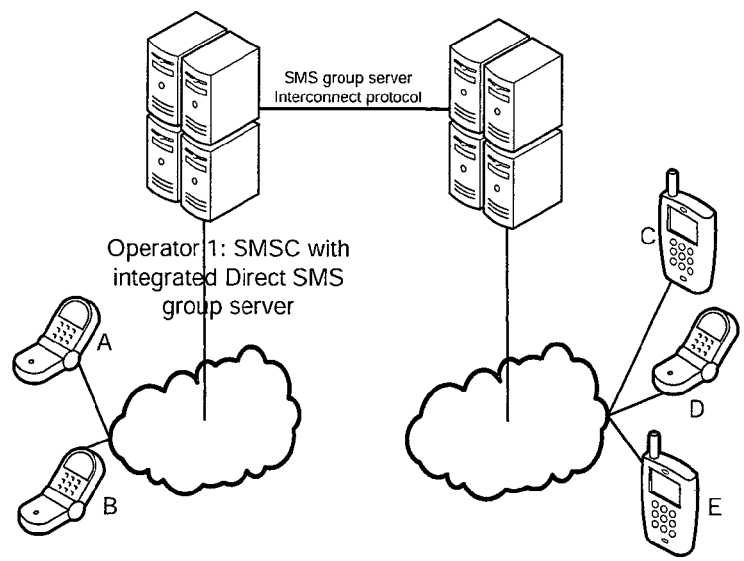
FIG. 7 is a system diagram for another embodiment.

Referring to FIG. 7, an alternative embodiment is to still have the SMS group server 1 but to localize it to the own subscribers only, and instead agree on a message format between SMS group servers to transfer the information to the SMS group server of another operator. The SMS group server 1 of the other operator then sets up a session at receiving the initial message from the first operator and performs the same operations for his subscriber, thus allowing the functionality with each operator billing its own subscribers.

A good candidate protocol for interconnect is the use of SMPP, which already allows for the inclusion of the Reply-Path and also is already used between operators for interconnect (for example in the US). The change then is that the SMSCs at both sides need to be aware from the group messaging functionality and each set up a session for their subscribers.

In addition, if subscriber A and B reside at operator 1 and subscribers C, D, and E reside at operator two, efficiency is increased. Instead of sending 3 SMS messages across the SS7 network from operator 1 to operator 2, only one multi-recipient IP message is sent from operator 1 to operator 2 and the delivery of 3 messages is done within the network of operator to. This significantly reduces the international and/or intra-national SS7 traffic.

The invention is not limited to the embodiments described but may be varied in construction and detail.

The invention claimed is:

1. A messaging method carried out by devices and a messaging system in a communication network, the method comprising the steps of:
   an originating device sending messages with the same content and addressed to multiple terminating devices;
   the system receiving the messages, automatically detecting that the messages are intended by the originating device user as being a single message to be addressed to a plurality of users which shall form a group, correlating said messages as being for group messaging, and routing the messages to the terminating devices with a reply path address of the system;
   the reply path address being a global title address from a pool of global titles allocated to the system;
   the system storing a group messaging record with data for the originating and terminating devices; and
   the system subsequently receiving a reply from at least one terminating device, routing the reply to the originating device, and forwarding corresponding replies to the other terminating devices in the group.

2. The messaging method as claimed in claim 1, wherein the system correlates the messages by grouping them according to originating device and time of sending.

3. The messaging method as claimed in claim 1, wherein the system forwards the messages with an MT-FSM, in which the originating device information is included in the message body, and the recipient address is that of the specific terminating device.

4. The messaging method as claimed in claim 1, wherein the system transmits a confirmation message to the originating device when routing the messages to the terminating devices.

5. The messaging method as claimed in claim 1, wherein the messaging system assigns to each of a plurality of message service centres its own reply path address range for use in group messaging, and the service centre on which a multi-recipient group session originates assigns a reply path address from its own pool to the sessions, and, subsequently, replies are routed back to that specific service centre.

6. The messaging method as claimed in claim 5, wherein a session database is local to each service centre.

7. The messaging method as claimed in claim 1, wherein a plurality of message service centres of the system are assigned the same reply path address range for use in group messaging sessions, and when a new session originates, the service centre where the session is originating creates the new session in the session database and assigns a common reply path address to the session.

8. The messaging method as claimed in claim 1, wherein a plurality of message service centers of the system are assigned the same reply path address range for use in group messaging sessions, and when a new session originates, the service centre where the session is originating creates the new session in the session database and assigns a common reply path address to the session; and wherein a session database replicates the change to other session databases, thus ensuring resilience in case of a site failure.

9. The messaging method as claimed in claim 1, wherein, to indicate that a subscriber is part of the group an additional message is inserted at an initial submission setting up the group.

10. The messaging method as claimed in claim 1, wherein after reception of the initial message from the originating device, an additional message is generated by the system to all recipients indicating that a group session is set up and containing the addresses of all the other recipients, and this message includes the addresses of each recipient in the body text and also uses the same system address in its reply-path field for each recipient as the subsequently forwarded message will use.

11. The messaging method as claimed in claim 1, wherein group messaging is automatically set up in response to an initial message from the originating device which includes a command code, and replies to this message do not need to contain the command code, as they use an embedded reply path system address.

12. The messaging method as claimed in claim 1, wherein the system operates in response to a control command to extend the group by inviting a party not addressed by the originating device to ongoing group communication by allocating a reply path address for the additional party, informing the other group member by sending a message indicating that the additional party is made part of the group.

13. The messaging method as claimed in claim 1, wherein the system operates in response to a control command to remove a party from the group.

14. The messaging method as claimed in claim 1, wherein the system operates in response to a control command to send a list of participants who are active in a group session.

15. The messaging method as claimed in claim 1, wherein the system operates in response to a control command to send a reply to only a specified party and not the whole group.

16. The messaging method as claimed in claim 1, wherein the system operates in response to a control command to delete a party from the group.

17. The messaging method as claimed in claim 1, wherein the system operates in response to a control command to indicate usage of pre-defined group n so that it is not necessary to send a multi-recipient message from the device.

18. The messaging method as claimed in claim 1, wherein the system performs automatic group messaging detection by:
when the message is received from the originating device, storing the message and a time stamp in a database,
if the originating device sends another message, comparing all relevant fields to the message stored in the database, and if these are the same, the recipient is added to a recipient list in the database for this message and the submission is acknowledged, and
if any field is different, or after a configurable time-out expires, the group submission is considered to be complete, and the system then starts handling the message as a group message.

19. The messaging method as claimed in claim 1, wherein the system performs automatic group messaging detection by the originating device sending all of the messages in a single TCAP session or by the originating device using a field for a flag indicating that additional messages are waiting for submission by the originating device.

20. The messaging method as claimed in claim 1, wherein the system performs automatic group messaging detection by recognizing a specific keyword in the message from the originating device as indicating that a new group is to be started.

21. The messaging method as claimed in claim 1, wherein the system manages, either remotely or locally, a group messaging database having the following data:
session data, containing records identifying a group messaging session, the session data having a start time and a modify time, in which the modify time is updated every time a message is exchanged in the group, and in which the session data has a flag indicating whether the session is considered active or expired,
recipient data linking the recipients in a session to the sessions,
data per individual subscriber with active or retired session records with the allocated reply path number for that session and a reference to the session, and
a flag indicating status of the reply path.

22. The messaging method as claimed in claim 1, wherein the system manages, either remotely or locally, a group messaging database having the following data:
session data, containing records identifying a group messaging session, the session data having a start time and a modify time, in which the modify time is updated every time a message is exchanged in the group, and in which the session data has a flag indicating whether the session is considered active or expired,
recipient data linking the recipients in a session to the sessions,
data per individual subscriber with active or retired session records with the allocated reply path number for that session and a reference to the session, and
a flag indicating status of the reply path; and
wherein the flag indicating status of the reply path indicates whether it is active, retired or available, and the system manages a time stamp indicating when it went from active to retired, in which if a new session is set up, one of a number of available reply path addresses is selected and allocated to the session, and if a session has been inactive for a set period of time, for each recipient the associated reply path address is set to retired status and the time-stamp is set to that time, and in which after a minimum purge period has passed, the reply path address is set to available so that it can be re-used for new sessions.

23. A messaging system comprising an interface to mobile network elements and a circuit including at least one digital data processor, in which the circuit is perform the steps of:
- an originating device sending messages with the same content and addressed to multiple terminating devices;
- the system receiving the messages, automatically detecting that the messages are intended by the originating device user as being a single message to be addressed to a plurality of users which shall form a group, correlating said messages as being for group messaging, and routing the messages to the terminating devices with a reply path address including the system;
- the reply path address being a global title address from a pool of global titles allocated to the system;
- the system storing a group messaging record with data for the originating and terminating devices;
- the system subsequently receiving a reply from at least one terminating device, routing the reply to the originating device, and forwarding corresponding replies to the other terminating devices in the group.

24. A computer program product, comprising a non-transitory computer usable medium having a computer readable program code embodied therein, said computer readable program code being executed to implement a method comprising the steps of:
- receiving messages with the same content and addressed to multiple terminating devices, automatically detecting that the messages are intended by an originating device user as being a single message to be addressed to a plurality of users which shall form a group, correlating said messages as being for group messaging, and routing the messages to the terminating devices with a reply path address including a system;
- the reply path address being a global title address from a pool of global titles allocated to the system;
- storing a group messaging record with data for the originating and terminating devices; and
- subsequently receiving a reply from at least one terminating device, routing the reply to the originating device, and forwarding corresponding replies to the other terminating devices in the group.

* * * * *